United States Patent [19]

Wilwerding

[11] 4,059,757
[45] Nov. 22, 1977

[54] FOCUS SYSTEM FOR MOVIE CAMERAS

[75] Inventor: Dennis J. Wilwerding, Littleton, Colo.

[73] Assignee: Honeywell Inc., Minneapolis, Minn.

[21] Appl. No.: 728,567

[22] Filed: Oct. 1, 1976

[51] Int. Cl.² ............................................. G01J 1/20
[52] U.S. Cl. .................................. 250/201; 250/204; 354/25; 356/4
[58] Field of Search ............... 250/201, 204, 209, 234, 250/235; 324/25; 356/1, 4, 5

[56] References Cited

U.S. PATENT DOCUMENTS

| 3,736,057 | 5/1973 | Harvey | 356/4 |
| 3,967,110 | 6/1976 | Rogers et al. | 250/201 |
| 4,004,852 | 1/1977 | Pentecost | 354/25 |
| 4,011,446 | 3/1977 | Swanberg | 250/201 |

Primary Examiner—David C. Nelms
Attorney, Agent, or Firm—H. L. Hanson

[57] ABSTRACT

An automatic continuous focus system of the spatial image correlation type uses a dual scan technique.

35 Claims, 15 Drawing Figures

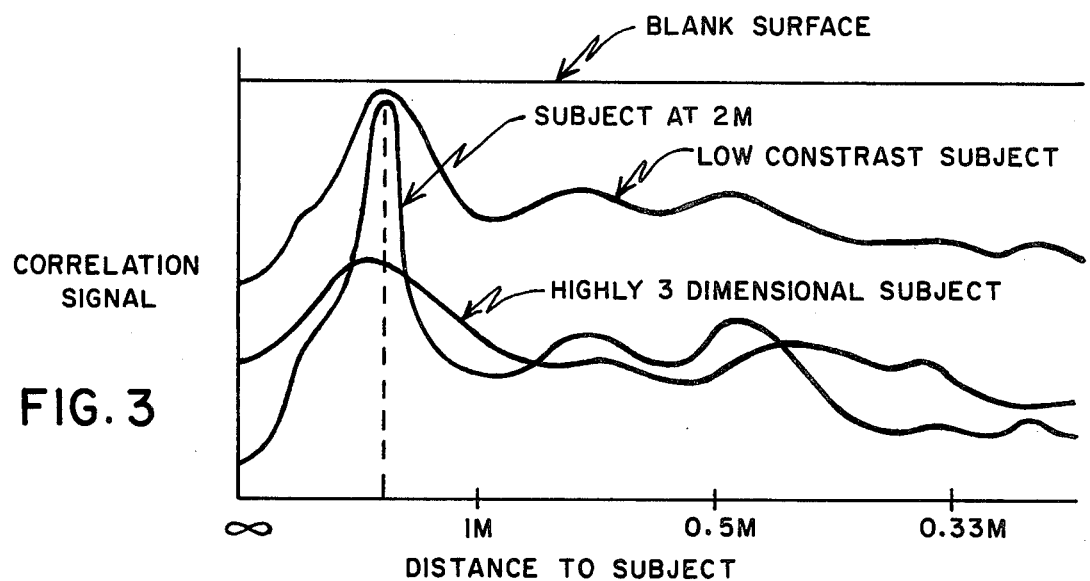
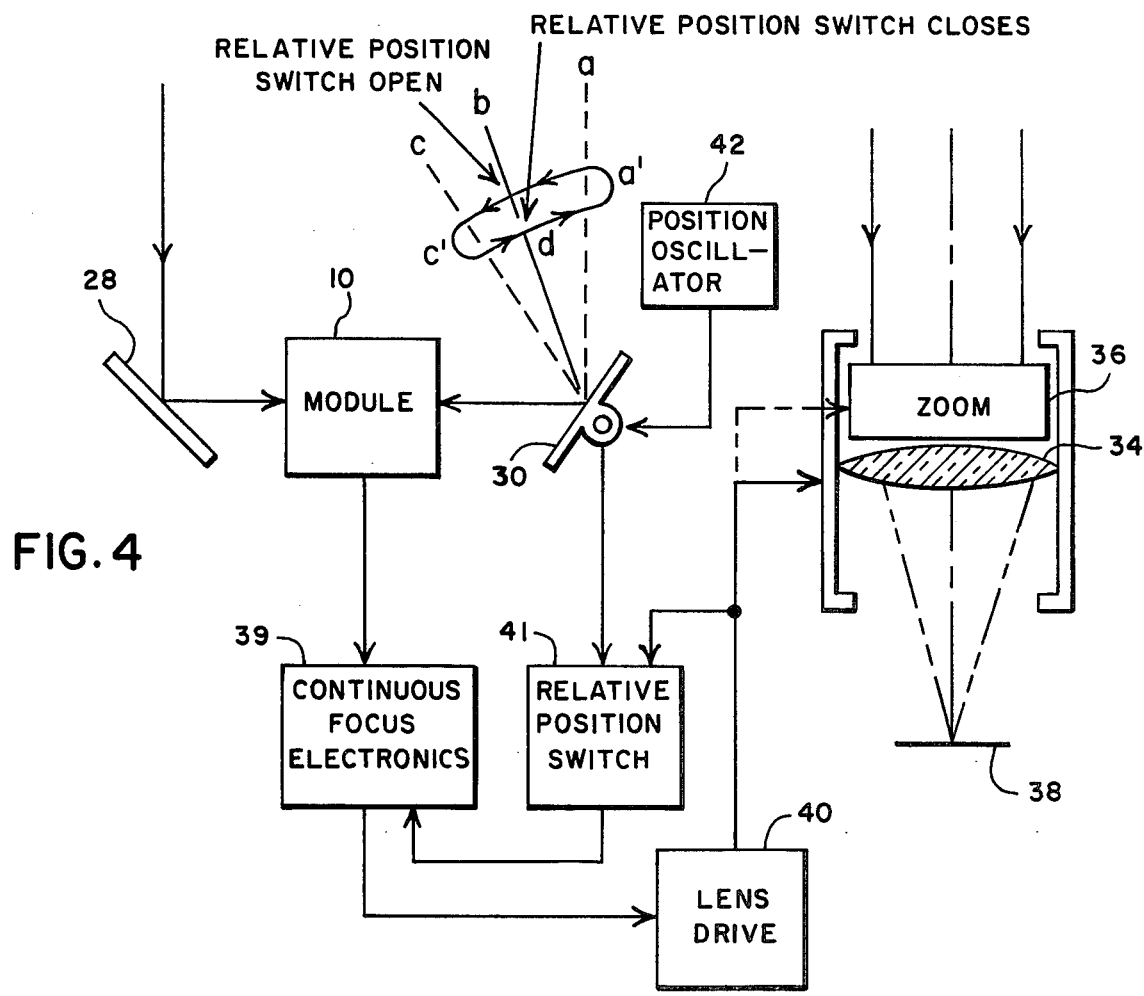

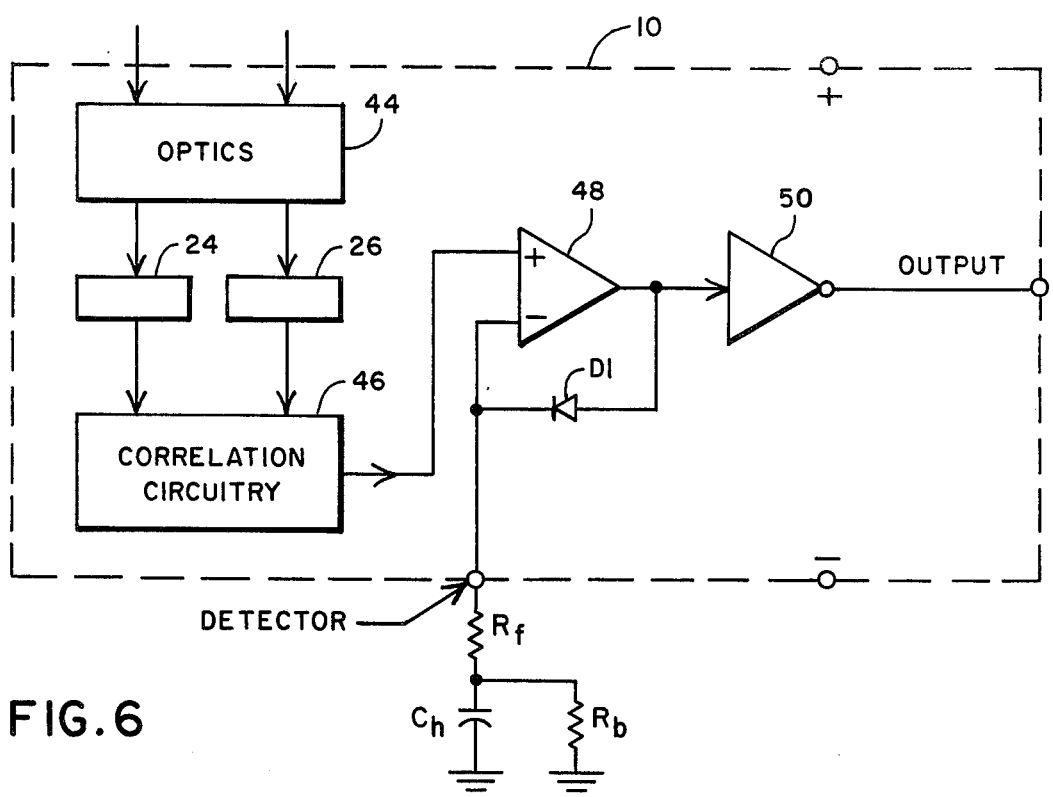
FIG. 6
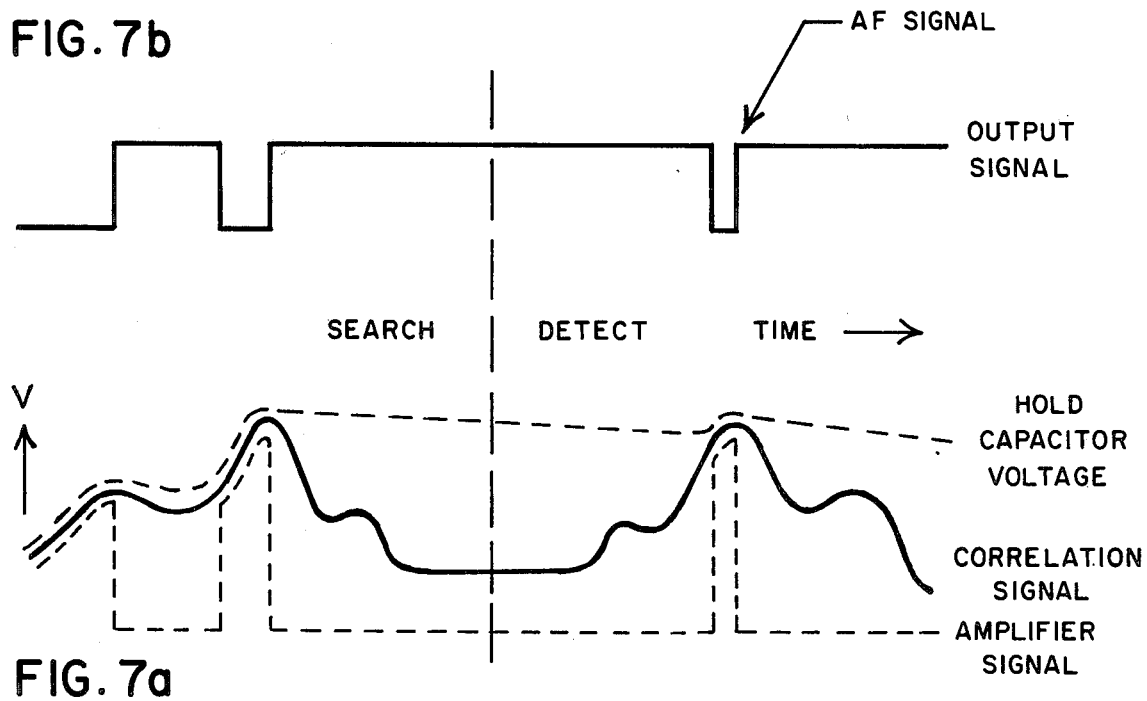
FIG. 7b
FIG. 7a

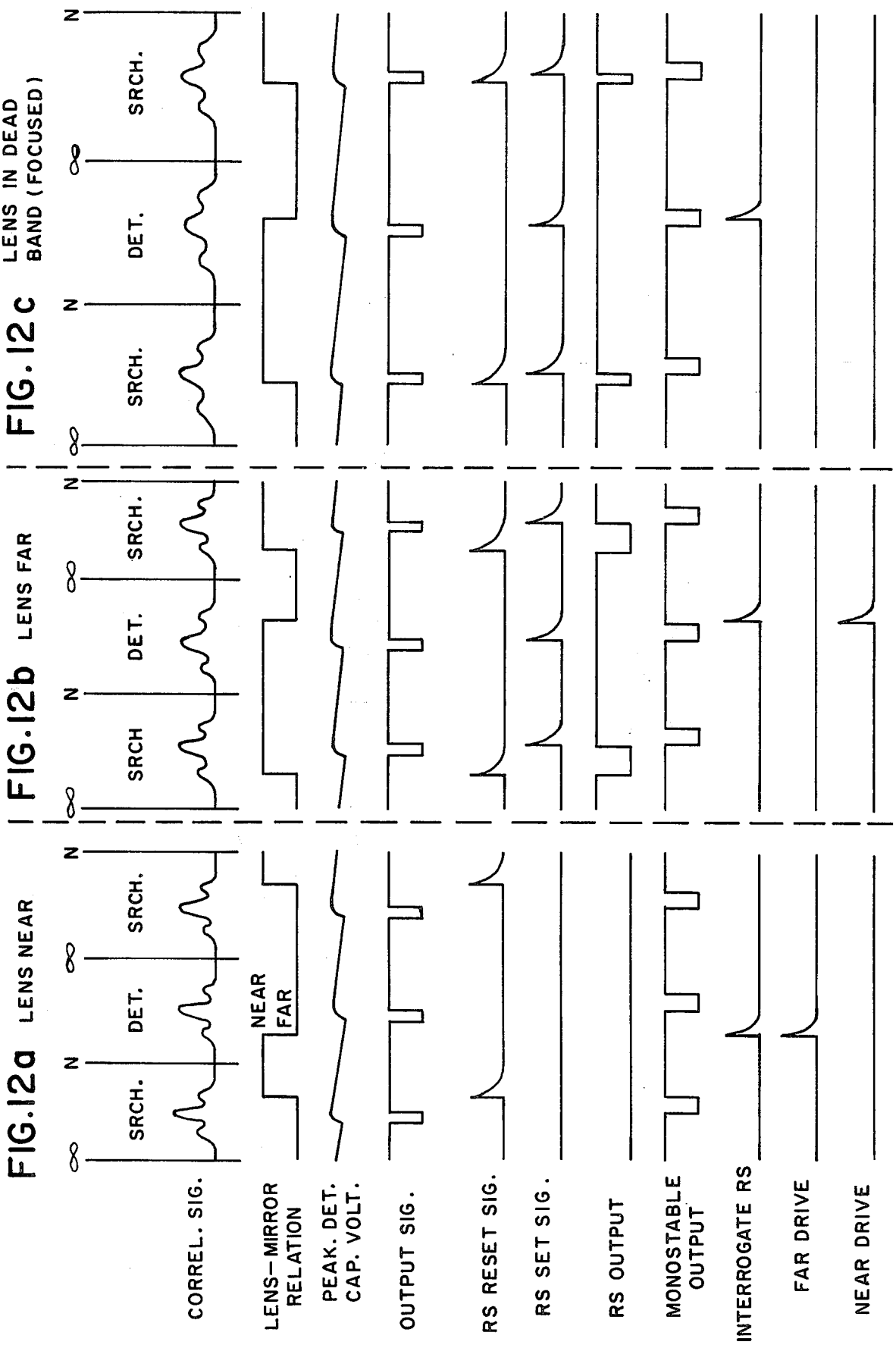

FOCUS SYSTEM FOR MOVIE CAMERAS

REFERENCE TO CO-PENDING APPLICATION

Reference is made to co-pending application by Dennis J. Wilwerding, Ser. No. 728,566, entitled "Focus Control System" which was filed on even date with this application and is assigned to the same assignee.

BACKGROUND OF THE INVENTION

The present invention relates generally to apparatus for providing a measure of the distance between the apparatus and an object. In particular, the present invention is directed to automatic focusing systems in which a primary optical means, such as the taking lens of a camera, is moved to maintain an image of the object in focus at the plane of a photographic film.

One highly advantageous type of automatic focus apparatus is the spatial image correlation type. Examples of the different forms of arrangements of this type can be found in copending U.S. patent applications Ser. 627,607, filed Oct. 31, 1975 and Ser. No. 720,963 filed June 29, 1976 by Norman L. Stauffer, which are assigned to the same assignee as the present application, in U.S. Pat. Nos. 3,836,772, 3,838,275, and 3,958,117 by Normal L. Stauffer, and in U.S. Pat. No. 3,274,914 by Biedermann et al.

The typical spatial image correlation apparatus includes two auxiliary optical elements (for example, lenses or mirrors) and two detector arrays. The object distance is determined by moving one of the auxiliary optical elements relative to one of the radiation responsive detector arrays until they occupy a critical or correlation position. This position is a measure of the existing object to apparatus distance.

The relative movement of the auxiliary optical element and the detector array occurs for each distance measuring or focusing operation. The critical condition occurs when there is best correspondence between the radiation distributions of the two auxiliary or detection images formed on the two detector arrays. This condition of best distribution correspondence results in a unique value or effect in the processed electrical output signals. Typically, the correlation signal will contain a major extremum (either a peak or a valley) and one or more minor extrema. The major extremum is indicative of the distance to the object.

In most systems, the relative movement of the auxiliary optical element with respect to the detector arrays is achieved by moving a lens or mirror relative to one of the detector arrays. The particular position of the element when best distribution correspondence occurs provides a determination of the existing object to apparatus distance. The position of the auxiliary optical element at the time of best correspondence is used to control the position of the primary optical element, such as a camera taking lens.

In the previously mentioned co-pending application Ser. No. 700,963 by Normal L. Stauffer, the correlation signal includes a major peak which is indicative of the distance to an object. A peak detector is used to determine this major peak. A complete scan of all focus zones is provided to insure that the highest correlation is achieved. The location of the last and, therefore, highest peak detected corresponds to the desired focus position.

SUMMARY OF THE INVENTION

The system of the present invention is an automatic focusing system which uses a "dual scan" technique. The system may include range sensing means, comparison signal means, comparing means, and positioning means.

The range sensing means provides a correlation signal having a major extremum indicative of the distance to an object, and includes scanning means for providing a plurality of scan cycles. Each cycle includes first and second scans of an image of the object.

The comparison signal means provides a comparison signal during the second scan which is a function of the amplitude of the major extremum in the correlation signal during the first scan. The comparing means compares the correlation signal with the comparison signal and produces an output signal which changes from a first to a second state only once during the second scan. The positioning means positions the primary optical means in a direction determined by the relative position of the scanning means and the primary optical means when the output signal changed state during the second scan.

BRIEF DESCRIPTION OF THE DRAWINGS

FIG. 3 shows the correlation signal as a function of distance to the subject for several different conditions.

FIG. 4 shows a dual scan continuous focus system.

FIG. 6 shows the peak detection circuitry associated with the module of FIG. 1.

FIGS. 7a and 7b show an example of the hold capacitor voltage, correlation signal amplifier signal, and output signal produced by the module of FIGS. 1 and 6.

FIGS. 12a, 12b, and 12c show waveforms associated with the operation of the system of FIG. 11 for three different conditions.

DETAILED DESCRIPTION OF THE PREFERRED EMBODIMENTS

Image Correlation Range Sensing Means

Figure 1:
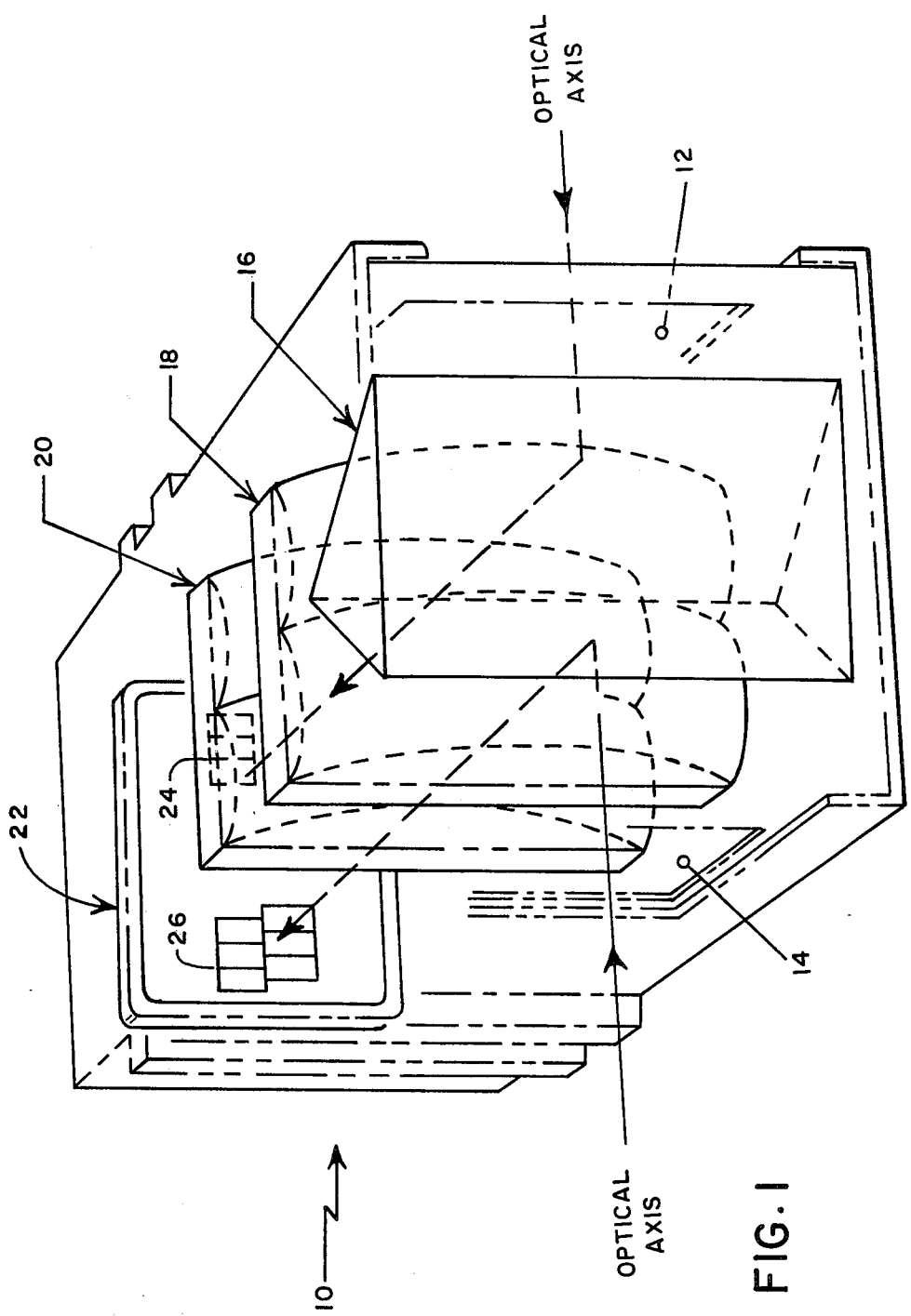
FIG. 1 shows a spatial image correlation range sensing module which may be used in conjunction with the dual scan automatic focus system of the present invention.

FIG. 1 shows one particularly advantageous form of image correlation range sensing means which may be used in the dual scan automatic focus system. A more detailed description of this modular form of range sensing means may be found in the co-pending application by Norman L. Stauffer, Ser. No. 627,607.

Module 10 of FIG. 1 has two viewing ports, 12 and 14, located on opposite sides. Inside the module is a prism, 16, a twin two-element lens system formed by twin biconvex lens 18 and twin meniscus lens 20, and an integrated circuit 22 including detector arrays 24 and 26 and signal processing circuitry (not shown) connected to the detector arrays. The elements in the module are permanently mounted and require no adjustment or alignment.

Figure 2:
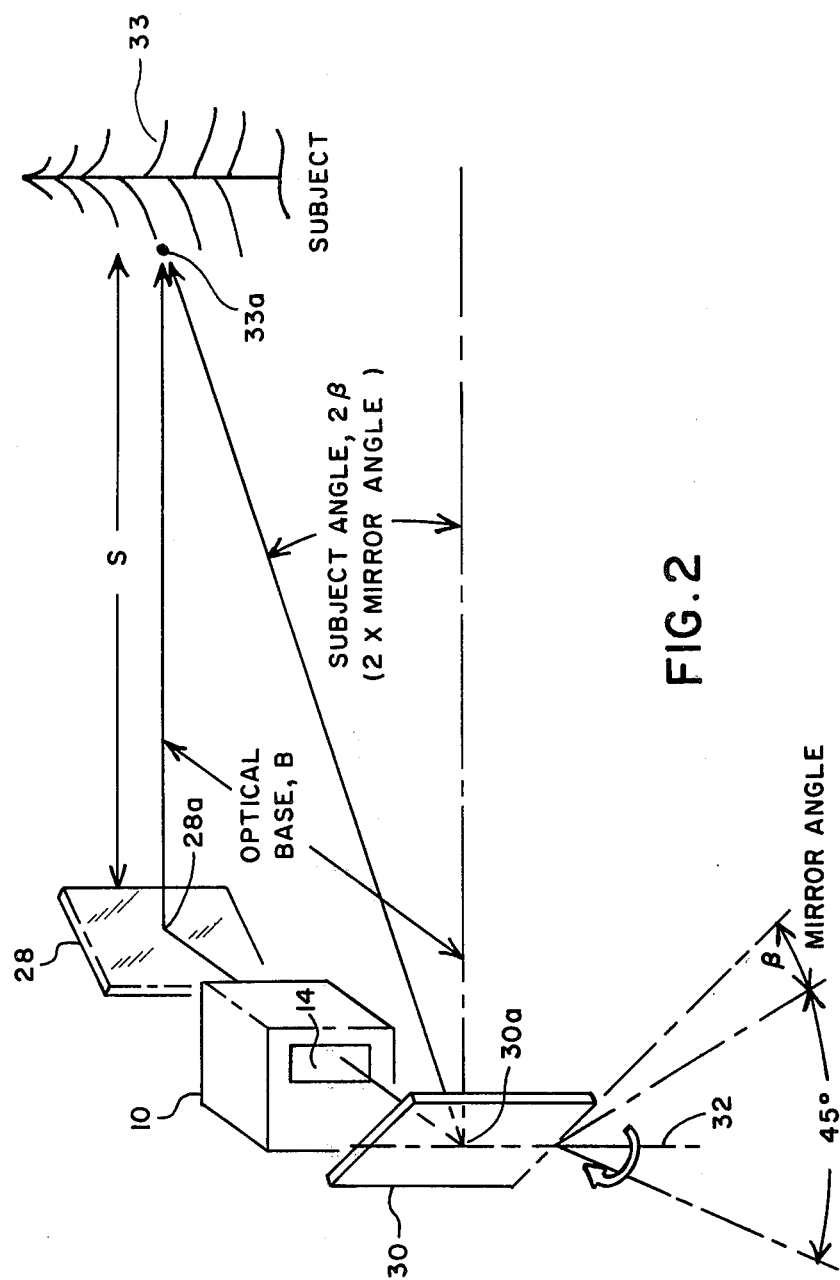
FIG. 2 shows the basic optical configuration of a system using the module of FIG. 1.

To use module 10, two mirrors, 28 and 30, must be positioned so as to direct light from the subject into the two viewing ports. Such a basic system is illustrated in FIG. 2. Mirror 28 provides a fixed view of a portion of the subject field. This portion of the field is imaged within the module 10 onto detector array 24. Mirror 30 is mounted so that it can be rotated about an axis, 32, generally perpendicular to the plane formed by points 28a and 30a on mirrors 28 and 30 and a centralized point 33a on a remote subject 33. Adjustment of mirror 30 allows detector array 26 to view a selected area of the subject field. The light intensity pattern on each array is nearly identical when the subject angle $2\beta$ fulfills the conditions $$\tan (2\beta) = B/S,$$

where $B$ is the angle through which mirror 30 is rotated from a 45° position where light from infinity is reflected into viewing port 14. As seen in FIG. 2, angle 2 is also the angle between a line drawn from point 33a on subject 33 and point 30a on mirror 30, and a line drawn from point 33a on subject 33 and point 28a on mirror 28. $B$ is the length of the base from point 28a on mirror 28 to point 30a on mirror 30, and $S$ is the distance between point 33a on subject 33 and point 28a on mirror 28. This identity is recognized by the correlation electronics of integrated circuit 22 as a major extremum (preferably a peak) in the correlation signal.

FIG. 3 illustrates the correlation signal as a function of distance to the subject. In FIG. 3, a subject at approximately 2 meters distance from the optical system produces a peak output corresponding to that distance, as shown by the curve labelled "Subject at 2M." At the infinity position mirrors 28 and 30 are each at 45°, thus directing the optical axis from each into two parallel lines. As movable mirror 30 is adjusted from this position, the correlation signal as illustrated in FIG. 3 is produced. Secondary peaks of lesser amplitude may be present as indicated in FIG. 3. If the optical system views a complete blank surface, devoid of any brightness variations, then the correlation signal will be a constant high level. A very low contrast subject will produce, as indicated, a signal which does not drop very much below peak value at out-of-correlation conditions. A highly three-dimensional subject may not produce as high a peak signal as that produced by a strictly two-dimensional flat scene.

Dual Scan Continuous Focus Systems

The present invention is a dual scan automatic focus system which is used in conjunction with spatial image correlation range sensing means. During the first scan (the "search scan"), the correlation signal from the spatial image correlation range sensing means is interpreted and the amplitude of the major extremum of the correlation signal is stored. In the second scan (the "detection scan"), which is typically a reverse direction scan, a comparison signal which is a function of the stored amplitude is compared to the correlation signal to pick out the proper point of best focus.

In the dual scan system of the present invention, two angular scans of mirror 30 are required. The first scan is in one direction (for example, from far to near), and in the second scan the direction of scanning mirror 30 may be reversed (for example, from near to far).

During the scanning operation, the relative positions of the radiation distributions on the first and second detector arrays 24 and 26 vary with time. The signal processing circuitry on integrated circuit 22 compares the signals from the first and second detector arrays 24 and 26 and produces a time varying correlation signal which exhibits a major extremum when the best correspondence of the radiation distributions on first and second detector arrays 24 and 26 is obtained.

The basis of the present invention is the storing of the amplitude of the major extremum during the first scan and the use of that amplitude to locate the major extremum during the second scan. The primary optical means (e.g. a camera taking lens) is moved, if necessary, during or immediately after the second scan.

The dual scan system may be used with either still cameras or motion picture cameras. In either case, the first scan of the dual scan is used to store the amplitude of the major extremum and the second scan is used to position the primary optical element (the taking lens).

In some situations, for example in a movie camera, continuous focus action is desired. This allows the camera to follow moving subjects or to refocus on new subjects as the camera direction is changed.

A dual scan continuous focus system for a movie camera is shown in basic diagram form in FIG. 4. The system includes module 10, mirrors 28 and 30, taking lens 34, zoom optics 36, film 38, continuous focus control electronics 39, lens drive 40, relative position switch 41, and position oscillator 42.

Scan mirror 30 is provided with a continuous oscillatory motion by position oscillator 42. This motion extends to a position $a'$ beyond infinity and to a position $c'$ somewhat inside of the desired near focus distance. Each scan cycle of scan mirror 30 includes a "search scan" and a "detection scan."

The opening and closing of relative position switch 41 signals the fact that taking lens 34 and scan mirror 30 are coincidentally looking at, and focused to, the same subject distance. Switch 41 is closed when mirror 30 is in the far field with respect to the position of lens 34 and is open when mirror 30 is in the near field with respect to the position of lens 34. Relative position switch 41 is connected to continuous focus control electronics 39.

Switch 41 may take a variety of different forms, depending on the particular mechanical embodiment of lens drive 40 and position oscillator 42. Examples of relative position switches are shown in the previously mentioned Stauffer application. Relative position switch 41 must be able to operate for many cycles and should be capable of factory adjustment to permit system alignment.

Figure 5:
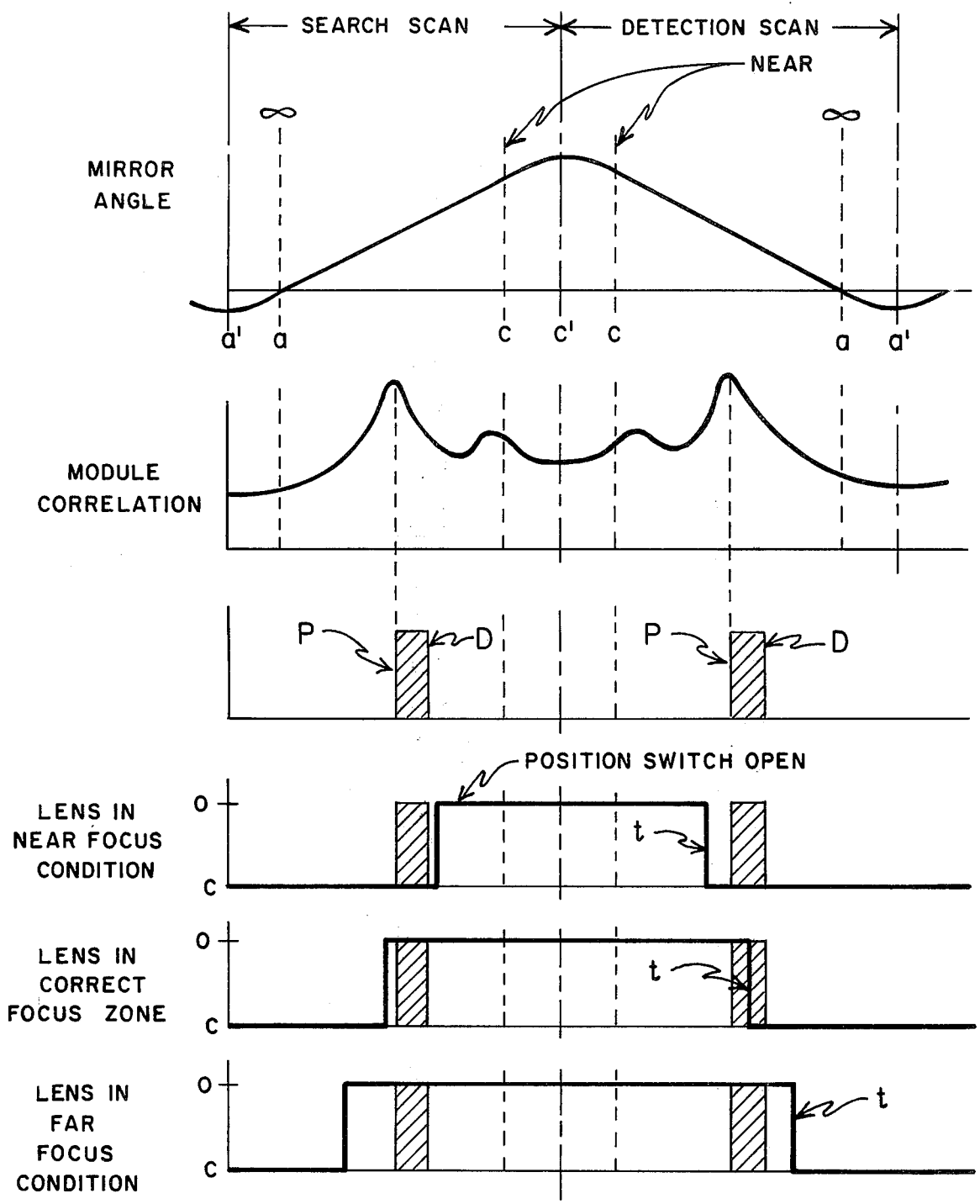
FIG. 5 shows waveforms associated with the operation of the system of FIG. 4.

FIG. 5 illustrates waveforms used in providing continuous focus control. The first waveform shows one cycle of the continuous oscillation of scan mirror 30. The cycle includes a search scan from $a'$ to $c'$ and a detection scan from $c'$ to $a'$. The second waveform shows the correlation signal resulting from this motion. This waveform is repeated over and over again in a continuous fashion when the same subject is viewed. The third waveform shows the creation of an AF signal, $p$, near the maximum correlation signal and also following this pulse a short time zone D, which is the focus deadband, is selected to provide an acceptable zone of sharp focus and to provide non-oscillatory motion of the focusing system.

The operation of the system is as follows: The system first interrogates the various signals to determine if the trailing edge, t, of the time interval when the switch is open, occurs during the time interval D of the detection scan. If this is the case, then no focus drive signal can be provided and correct focus position is assumed. If this is not the case, then circuitry determines if the AF signal occurred during the period the switch is open, or during the period that the switch is closed. An AF signal occurring during the switch open portion of the cycle causes the camera lens 34 to be driven toward its near limit position eventually causing it to fall within zone D, terminating focusing action with the subject in focus. Alternatively, if the AF signal occurs during the period when the switch is closed, continuous focus control electronics 39 causes camera lens 34 to be driven toward its infinity position stopping at the position which causes the subject to be in acceptable focus. Examples of these three conditions are illustrated in the fourth, fifth, and sixth waveforms shown in FIG. 5.

The desirability of using a dual scan system is its highly reliable rejection of minor peaks which might activate the peak detection circuitry prematurely. The dual scan system also provides rejection of false correlation peaks which might be introduced by violent camera or subject motion.

Dual Scan Peak Detection and Production of the AF Signal

FIG. 6 shows module 10 as it is used in preferred embodiment of the present invention. Module 10 includes optics (generally designated by numeral 44) for forming two images, two detector arrays, 24 and 26, and correlation circuitry 46 for producing an analog correlation signal proportional to the degree of correlation of the respective optical images. The correlation signal increases positively with increasing correlation.

Extremum sensing circuitry is provided in module 10 to process the correlation signal to determine when the major correlation extremum occurs. In the preferred embodiment shown in FIG. 6, the major extremum is a peak and the extremum sensing circuitry is peak detection circuitry. This circuitry includes differential amplifier 48, diode D1, inverter 50, filter resistor $R_f$, discharge timing resistor $R_b$, and hold capacitor $C_h$. In the embodiment shown in FIG. 6, resistors $R_f$ and $R_b$ and Capacitor $C_h$ are external components and are connected to the "Detector" terminal of module 10. Module 10 develops, at the terminal entitled "output" a digital positive going output signal (i.e. the AF signal) at correlation maxima capable of operating external circuitry to stop the camera lens at the proper focus position. It is this change of state of the output signal (i.e. the AF signal), and not the output signal level, which is indicative of the occurrence of a focus peak.

Hold capacitor $C_h$ connected to the "Detector" terminal provides a hold or comparison signal for the peak detection circuitry and to a large extent controls the sensitivity, noise rejection and overall characteristics of the focus system. Differential amplifier 48 compares the correlation signal with the voltage stored on hold capacitor $C_h$. As the correlation signal rises in voltage, the output of amplifier 48 rises in voltage with it, charging capacitor $C_h$ through feedback diode D1 connected between the output and inverting input. This causes the inverting input to follow the non-inverting input so that the voltage on capacitor $C_h$ is equal to the correlation signal voltage during that portion of time when the correlation signal is rising. Once the correlation signal reaches its peak value and begins to decrease, the voltage on the hold capacitor $C_h$ cannot decrease because of the decoupling of feedback diode D1. Consequently, the output voltage of amplifier 48 falls immediately to negative supply potential. This rapid decrease in the amplifier signal is indicative of a correlation or major peak having occurred. The amplifier signal following a complex correlation waveform is shown in FIG. 7a. FIG. 7b shows the output signal from module 10 produced for the dual scan of FIG. 7a.

During the search scan shown in FIGS. 7a and 7b, the amplifier signal follows the input correlation signal until the first minor peak is reached, at which time the signal drops to negative supply. The amplifier signal begins to rise again when the correlation signal achieves the value equal to the first minor peak and continues to rise until the major peak or correlation peak is found. At this point, the amplifier signal again drops to negative supply. During the detection scan, only the correlation peak is detected. This is because hold capacitor $C_h$ has maintained a voltage proportional to the correlation peak detected during the search scan. This hold capacitor voltage or "comparison signal" exceeds the correlation signal for all portions of the detection scan, except the correlation peak. This is the primary virtue of dual scan operation.

Figure 8:
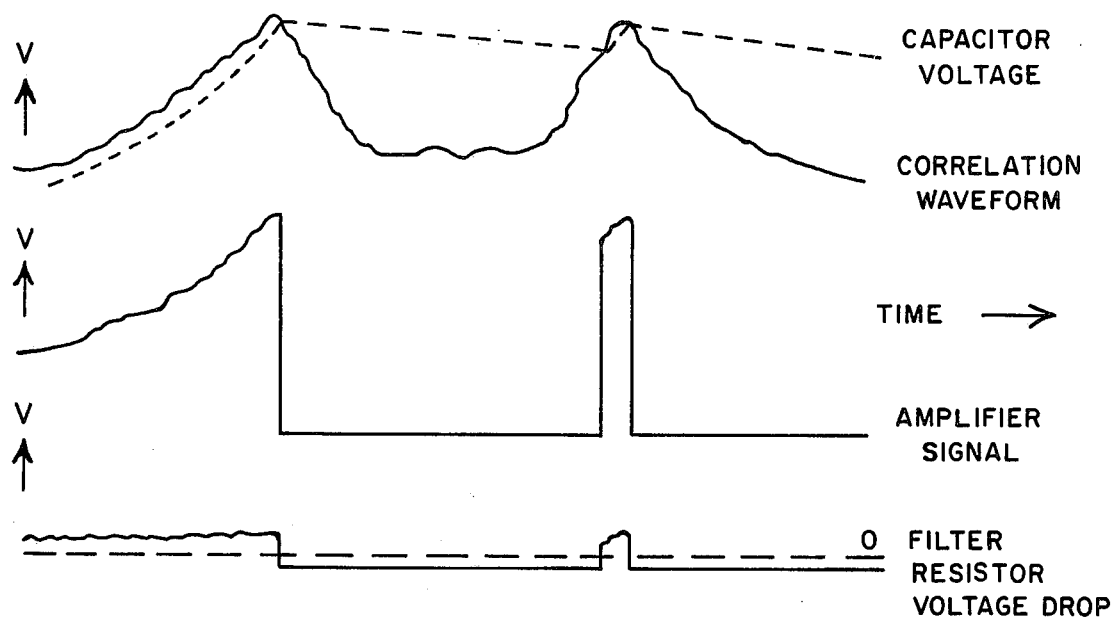
FIG. 8 shows waveforms illustrating the operation of the peak detector filter.

While the peak detection circuitry must be capable of accurately following the correlation signal and determining when a peak occurs, it must at the same time be insensitive to noise on the correlation signal. Noise immunity is achieved by filter resistor $R_f$ in series with the hold capacitor $C_h$. In FIG. 6, resistor $R_f$ is external to module 10 and preferable has a value of about 300 ohms to maintain amplifier stability. Alternatively, filter resistor $R_f$ may be included in module 10. Filter resistor $R_f$ creates a lag in the hold capacitor voltage so that when the correlation signal begins to decrease, it must decrease by some finite value before the amplifier signal from amplifier 48 changes states. FIG. 8 indicates a correlation signal on which noise occurs. This noise could be caused by either fluorescent light intensity modulation that is induced optically, or electrical noise induced by external sources.

Figure 9:
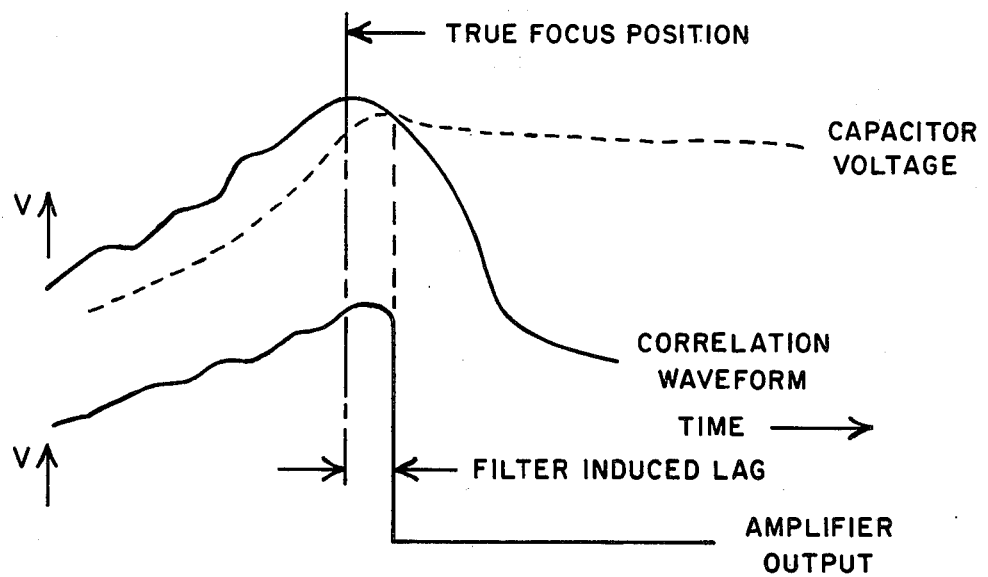
FIG. 9 shows waveforms similar to FIG. 8 but exaggerated to illustrate filter induced focus lag.

As can be seen in FIG. 8, the noise that exists on the correlation signal may cause many transitions during the rising portion of the correlation signal. Resistor $R_f$ in series with hold capacitor $C_h$ eliminates the multiple transitions caused by the noise present on the correlation signal. Noise inhibiting is only effective for rising correlation signals because as the rate of change of correlation signal with respect to time decreases, the effective filtering decreases. An expansion of the peak of the correlation waveform is shown in FIG. 9. The effect of the low-pass noise rejection filter on the hold capacitor voltage is exaggerated for purposes of description.

FIG. 9 indicates that the point at which the amplifier changes states no longer corresponds exactly to the correlation peak, but lags the peak in time. The amount of lag exhibited is dependent upon the rate of change of the correlation signal. This rate of change is affected by the scene contrast, the scene subject content, the chosen focus scan rate, the number of zones of focus required and the optical base length of the focus system. It is because of the variation of these parameters which affect the rate of change of the correlation signal that the value of hold capacitor $C_h$ should be suitably chosen for each application so that the focus lag can be made sufficiently small.

In dual scan operation, it is also necessary to control the amount that hold capacitor $C_h$ discharges between peaks. This is because the correlation signal peak voltages during the search scan and the detection scan may not be equal because of camera motion, subject motion, mirror axis wobble or low scene illumination. The hold capacitor discharge rate is controlled by discharge timing resistor $R_b$ is parallel with the capacitor as shown in FIG. 6.

The resistance of discharge timing resistor $R_b$ is based on hold capacitor $C_h$, the desired amount of droop in the hold capacitor voltage, and the maximum time between peaks. In focus systems requiring a small value hold capacitor, the use of an external discharge timing resistor is frequently not required because of approximately 1 microampere of leakage current presented by the input impedance $Ri$ of amplifier 48. This is equivalent to 3.5 megohms of total bleed resistance $R_b'$.

Figure 10:
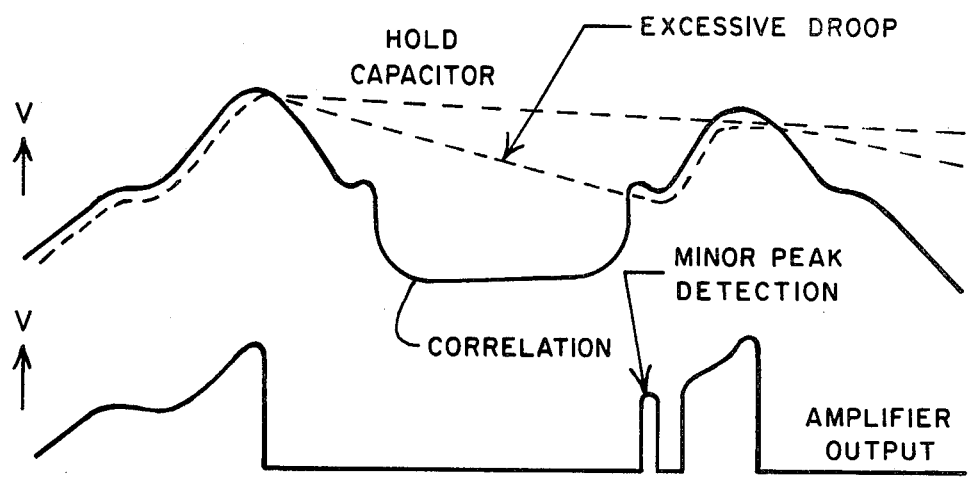
FIG. 10 shows waveforms which illustrate the effect of different values of the discharge timing resistor.

The effect of using a discharge timing resistor is shown in FIG. 10. Decreasing the value of discharge timing resistor $R_b$ increases the amount of droop in the detection hold capacitor voltage. Excessive droop may cause the focus system to accept a minor peak during the detection scan.

The value of hold capacitor $C_h$ is chosen from a knowledge of the minimum time ($T_z$) required for the focus system to traverse a single focus zone. The capacitor voltage must charge to a level sufficiently close to the correlation voltage within $T_z$ to ensure that a decrease in correlation can be detected within that focus zone. A suitable solution is to choose the filter resistor-hold capacitor time constant $R_f C_h = \frac{1}{4} T_z$, resulting in less than a 2% difference between the correlation and hold capacitor voltages in a zone interval $T_z$.

Other time constants can be chosen with corresponding variations in the system lag and noise sensitivity. Setting the time constant equal to $\frac{1}{3}$ to $\frac{1}{4}$ of a zone interval, however, has yielded consistently good results.

Discharge timing resistor $R_b$ is chosen based on the maximum possible time interval $T_s$ between focus peaks. Since the capacitor voltage decay between focus peaks is expotential, the decay time constant is given by $$R_b' C_h = -T_s/ln(1-\% \text{ droop}).$$

In a well designed system, a capacitor voltage droop between major correlation peaks of 5 to 10% is sufficient to ensure that the peak will be detected while maintaining minor peak rejection. The value of $R_b'$ determined from the above equation includes the input resistance $Ri$ of the detector amplifier 48. The actual additional discharge timing resistance $$R_b = \frac{R_b' \cdot Ri}{Ri - R_b'}.$$

The following example illustrates how the values of $C_h$ and $R_b$ may be selected. In this example, the following parameters are assumed:

Sinusoidal Scan Frequency, $F = 18$ Hz
Scan Overtravel = 40%
Number of Focus Zones = 10
Desired Droop = 5%

With 40% overtravel of the scanning mirror (which results in nearly constant zone intervals $T_z$, the active portions of the scan cycle occur in 45°–135° and 225°–315° of scan drive period. The maximum time between peaks is three-fourths of the scan period.

Therefore, the maximum time between peaks ($T_s$) is:

$$T_s = \frac{3}{4} \cdot \frac{1}{F} = \frac{3}{4 \times 18} = 41 \text{ ms}$$

The time required to traverse 10 focus zones is 45° to 135° of the scan or $\frac{1}{4}$ of the scan period. The time $T_z$ to traverse a focus zone is:

$$T_z = \frac{1}{4FN} \cdot \frac{1}{4 \times 10 \times 18} = 1.375 \text{ ms}$$

Hold capacitor $C_h$ is:

$$C_h = \frac{T_z}{4 \times R_f} = \frac{1.375 \times 10^{-3}}{4 \times 300} = 1.15 \text{ }\mu\text{fd, use } 1.0 \text{ }\mu\text{fd.}$$

The total bleed resistance $R_b'$ is:

$$R_b' = -T_s/C \, ln(1-\% \text{ droop})$$

$$R_b' = \frac{-.041}{1 \times 10^{-6}(0.05)} = 0.82 \text{ megohms.}$$

Discharge timing resistor $R_b$ is:

$$R_b = \frac{R_b' \cdot Ri}{Ri - R_b'} = \frac{.82 \times 3.5 \times 10^6}{3.5 - .82} = 1.02 \text{ megohms, use } 1.0 \text{ megohms.}$$

Dual Scan Continuous Focus Control Electronics

The AF signal (i.e. the positive logic "0" to "1" transition in the output signal) indicates that a correlation peak has occurred. The continuous focus control electronics uses the AF signal to develop a control signal capable of moving the camera lens to the proper focus position by operation of lens drive means.

Figure 11:
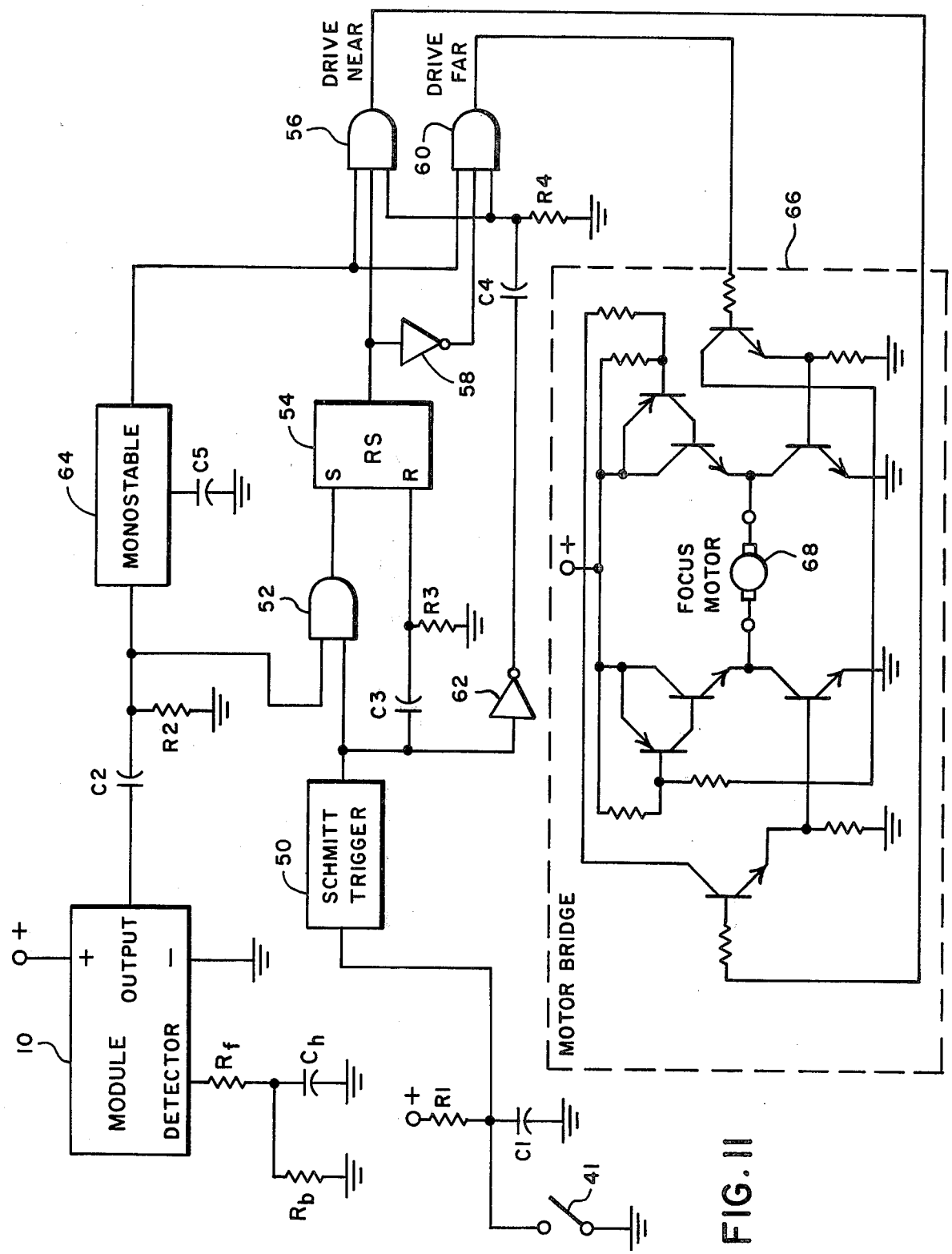
FIG. 11 is a schematic diagram of a dual scan continuous focus control electronics.

FIG. 11 shows a schematic diagram of a preferred embodiment of the continuous focus control electronics for a dual scan continuous focus system. All timing signals for the system of FIG. 11 are derived from relative position switch 41 which indicates the positional relationship of the taking lens of the camera and the scanning mirror. In the embodiment shown in FIG. 11, switch 41 is closed when the scanning mirror is in the far field with respect to the taking lens position and is open when the scanning mirror is in the near field with respect to the lens position.

Resistor R1 and capacitor C1 are connected in series between a positive voltage supply terminal and ground. Switch 41 is connected in parallel with capacitor C1. R1 and C1 form a filter to prevent false signals caused by contact bounce. Schmitt trigger 50 has its input terminal connected to the junction of resistor R1 and capacitor C1. The output of Schmitt trigger 50, therefore, is determined by the state of switch 41.

The output signal from module 10 is differentiated by resistor R2 and capacitor C2. A positive pulse is produced when the AF signal occurs. The differentiated output signal and the output of Schmit trigger 50 are applied to the input terminals of AND gate 52. The output of AND gate 52 is connected to the set input of RS flip-flop 54. RS flip-flop 54 is set (a logic "1") only when the AF signal occurs while the mirror is in the near field, since output of Schmitt trigger 50 is a "1" when switch 41 is open.

The output of Schmitt trigger 50 is differentiated by capacitor C3 and resistor R3 and applied to the reset input of RS flip-flop 54. A reset pulse is applied to RS flip-flop 54, therefore, when the mirror enters the near field (i.e. Schmitt trigger 50 switches from a "0" to a "1").

The output of RS flip-flop 54 is applied to one input of AND gate 56. The output of RS flip-flop 54 is also inverted by inverter 58 and applied to one input of AND gate 60. The second inputs to AND gates 56 and 60 are produced by inverter 62, capacitor C4, and resistor R4. Inverter 62 inverts the output of Schmitt trigger 50, and capacitor C4 and resistor R4 differentiate the inverted signal. The resulting input to AND gates 56 and 60 is an interrogate pulse which occurs when switch 41 closes, indicating that the mirror is entering the far field.

The third input to AND gates 56 and 60 is derived from monostable 64. This input is a deadband signal which is normally a logic "1" but which may temporarily be a logic "0" for a time period determined by capacitor C5. The input to monostable 64 is connected to the differentiator formed by C2 and R2. Monostable 64, therefore, produces a pulse in response to the AF signal. The outputs of AND gates 56 and 60 are connected to the drive-near and drive-far inputs of motor bridge 66. Motor bridge 66 drives motor 68, which positions the taking lens. A "1" at the output of AND gate 56 causes motor bridge 66 to drive motor 68 and, therefore, the taking lens in the near field direction. Similarly, a "1" at the output of AND gate 60 causes motor bridge 66 to drive motor 68 and the taking lens in the far field direction.

The operation system of FIG. 11 is generally as follows: only the highest correlation signal will produce a peak detector output if the peak detector capacitor $C_h$ is not reset after each scan. Resistor $R_b$ provides some drive-down of the capacitor voltage on $C_h$ to ensure detection of the correlation peak. Using this knowledge, it is only necessary to determine if the AF signal occurs in the near or far field with respect to the prime lens focus position. This is accomplished by differentiating the AF signal and ANDing this signal with a signal corresponding to the positional relationship of the taking lens and the scanning mirror. The positional relationship signal is provided by switch 41, resistor R1, capacitor C1, and Schmitt trigger 50.

In the system shown in FIG. 11, the output of AND gate 52 is a "1" only when the AF signal occurs while the scanning mirror is in the near field with respect to the taking lens position. This situation can, of course, be reversed and the signals processed only for an AF signal occurring in the far field.

The output signal of AND gate 52 sets RS flip-flop 54, which was previously reset when the scanning mirror entered the near field. The state of RS flip-flop 54 is interrogated at the instant that the scanning mirror passes from the near to far field (i.e., that point at which the taking lens focus position and the scanning mirror focus position are coincident). The state of the RS flip-flop 54 is, therefore, indicative of whether the taking lens should be moved toward the near range or the far range. The interrogation is accomplished by differentiating the falling edge of the output of Schmitt trigger 50 with inverter 62, capacitor C4 and resistor R4, and applying this interrogate signal and the RS output to AND gates 56 and 60. The output of AND gate 56 goes to a "1" at interrogation when the AF signal occurs while the scanning mirror is in the near field. Similarly, the output of AND gate 60 goes to a "1" when the AF signal occurs while the scanning mirror is in the far field.

The single exception to this rule is created by the third input to AND gates 56 and 60. Monostable 64 provides the third inputs to AND gates 56 and 60. The output of monostable 64 is normally a "1" but is temporarily a "0" for a period which is started by the differentiated AF signal. The purpose of monostable 64 is to provide a focus deadband in which no motor drive pulse is given. This effectively eliminates continuous hunting for the exact focus point. A "0" output from monostable 64 effectively inhibits the interrogation pulse at AND gates 56 and 60 if the AF signal occurs sufficiently close to the edge of the near range window such that the monostable output pulse overlaps the interrogation pulse in time. In this state, no pulses are transmitted through AND gates 56 and 60 and, consequently, no motor pulses are generated.

The focus motor 68 moves the lens in a direction such that the position of the lens-mirror relation window is coincident with the AF signal. Motor 68 is connected to a bridge 66 such that it may be driven in either direction, the direction corresponding to which AND gate 56 or 60 transmits a pulse. In those systems in which the motor drive time from these pulses is insufficient to adequately move the lens, monostables may be added at the outputs of AND gates 56 and 60 to stretch the motor drive pulses to the desired length.

FIGS. 12a, 12b, and 12c illustrate the operation of the system of FIG. 11 for three different conditions. In FIG. 12a, the lens is in the near field with respect to the proper focus position. In FIG. 12b, the lens is in the far field with respect to the proper focus position. In FIG. 12c, the lens is within the desired tolerance ("the deadband") of the proper focus position.

In a continuous focus system like that required in a movie camera, the automatic focusing operation is a continuous series of automatic focusing cycles. In the present invention, each focusing cycle involves a search and a detection scan. As shown in FIG. 12a-12c, the search scan of a cycle may be from the infinity to the near extreme position of the scanning mirror. The detection scan of the cycle is a reverse scan from near to infinity. As illustrated by FIGS. 12a-12c, the system of FIG. 11 detects the correlation peak and sets the peak detector capacitor voltage during the search scan and adjusts the position of the lens, if necessary, during the detection scan.

FIG. 12a illustrates the operation of the system in the situation in which the lens is in the near field with respect to the desired focus position. Because the AF signal occurs when the scanning mirror is in the far field, no RS set signal is produced and the RS output remains "0". The monostable output does not correspond to the interrogate pulse and, therefore, a motor far drive signal is produced by AND gate 60.

In FIG. 12b, the lens is in the far field with respect to the desired focus position. In this case, the AF signal does occur while the scanning mirror is in the near field. An RS set signal is produced and the interrogate pulse occurs while the RS output is a "1". The monostable output pulse does not correspond in time to the interrogate pulse, and, therefore, a motor near drive signal is produced by AND gate 56.

In the situation shown in FIG. 12c, the monostable output and the interrogate pulse correspond in time. Production of motor drive signals by AND gates 56 and 60 is, therefore, inhibited. Since the lens is already within the "deadband," no movement is allowed.

The system of FIG. 11 can be implemented with a minimum number of components while providing the desired accuracy in focus. The process of making a focus decision only at the closing of the relative position switch 41 allows a simple switch to be used since filtering of contact bounce is accomplished simply by resistor R1 and capacitor C1 so long as detection of the opening time is not required.

Conclusion

The dual scan automatic focus system of the present invention provides reliable focusing of a camera lens with minimum electrical complexity. The dual scan of the present invention provides improved noise and false peak rejection.

While the present invention has been disclosed with reference to a series of preferred embodiments, workers skilled in the art will recognize that changes may be made in form and detail without departing from the spirit and scope of the invention. For example, instead of a motor drive bridge, the direction of movement of the lens could be controlled by a solenoid or solenoids. A three-position solenoid may be used, for example, to provide near, far, and deadband operation.

Although the application of dual scan continuous focus to movie cameras has been specifically discussed, continuous focus has application to other optical systems as well. Television cameras and SLR cameras, for example, may also use the present invention to advantage.

The embodiments of the invention in which an exclusive property or right is claimed are defined as follows:

1. An optical system comprising:
   lens means for providing a primary image of an object.
   scanning means for providing a plurality of scan cycles, each scan cycle comprising first and second scans of an auxiliary image of the object;
   range sensing means for receiving the auxiliary image and providing a correlation signal having a major extremum in each scan indicative of the distance to the object;
   extremum sensing means for receiving the correlation signal and providing an output signal which changes from a first to a second state only once during the second scan;
   relative position sensing means for producing a position signal having a third state when the scanning means and the lens means have a first positional relationship and having a fourth state when the scanning means and the lens means have a second positional relationship;
   focus control means for producing a position correction signal which is a function of the state of the position signal when the output signal changes from the first to the second state during the second scan; and
   lens drive means for positioning the lens means in response to the position correction signal.

2. The optical system of claim 1 and further comprising:
   deadband means for inhibiting the focus control means from producing the position control signal if the output signal changes from the first to the second state during the second scan within a predetermined interval of the change of the position signal from the third to the fourth state.

3. The optical system of claim 1 wherein the focus control means comprises:
   bistable means having a fifth state when the position signal changes from the fourth to the third state, and having a sixth state when the output signal changes from the first to the second state and the position signal is in the third state;
   first position correction signal producing means for producing a first position correction signal when the bistable means is in the fifth state and the position signal changes from the third state to the fourth state; and
   second position correction signal producing means for producing a second position correction signal when the bistable means is in the sixth state and the position signal changes from the third state to the fourth state.

4. The optical system of claim 3 and further comprising:
   deadband means for inhibiting the first and the second position correction signal producing means if the position signal changes from the third to the fourth state within a predetermined interval of the change of the output signal from the first to the second state.

5. The optical system of claim 4 wherein the focus control means further comprises:
   first pulse means for providing a first pulse when the output signal changes from the first to the second state.

6. The optical system of claim 5 wherein the focus control means comprises:
   second pulse means for providing a second pulse when the position signal changes from the fourth to the third state; and
   third pulse means for providing a third pulse when the position signal changes from the third to the fourth state.

7. The optical system of claim 6 wherein the bistable means comprises an RS flip-flop having set and reset inputs and an output.

8. The optical system of claim 7 wherein the first pulse is applied to the set input of the RS flip-flop when the position signal is in the third state.

9. The optical system of claim 8 wherein the second pulse is applied to the reset input of the RS flip-flop.

10. The optical system of claim 9 wherein the deadband means comprises monostable means for providing a deadband pulse of predetermined duration in response to the first pulse.

11. The optical system of claim 10 wherein the first and second position correction signal producing means comprise first and second AND gates.

12. The optical system of claim 11 wherein the first AND gate has inputs for receiving the deadband pulse, the third pulse, and an output from the RS flip-flop.

13. The optical system of claim 12 wherein the second AND gate has inputs for receiving the deadband pulse, the third pulse, and an output from the RS flip-flop which is the inverse of the output received by the first AND gate.

14. The optical system of claim 1 wherein the extremum sensing means comprises:
   hold capacitor means for storing a comparison signal having an amplitude dependent upon the amplitude of a previous extremum in the correlation signal; and
   comparing means for comparing the correlation signal and the comparison signal and providing an output determined by the comparison.

15. The optical system of claim 14 wherein the extremum sensing means further comprises:
   discharge timing means for discharging the hold capacitor means at a predetermined rate.

16. The optical system of claim 15 wherein the discharge timing means discharges the hold capacitor means by less than about 10% during the first and second scans.

17. The optical system of claim 14 wherein the comparing means changes from a seventh state to an eighth state when the amplitude of the comparison signal exceeds the correlation signal.

18. The optical system of claim 17 wherein the extremum sensing means further comprises:
   filter means for preventing the comparing means from changing from the seventh to the eighth state until amplitude of the correlation signal decreases by a predetermined amount.

19. The optical system of claim 18 wherein the filter means comprises:
   filter resistor means connected in series with the hold capacitor means.

20. The optical system of claim 1 wherein the scanning means scans from its far field position limit to its near field position limit during the first scan and scans from its near field position limit toward its far field position limit during the second scan.

21. An optical system comprising:
   lens means for providing an image of an object;
   scanning means for providing first and second scans of the object;
   range sensing means for providing a correlation signal having a major extremum in each scan;
   extremum sensing means for receiving the correlation signal and providing an output signal which changes from a first to a second state only once during the second scan, the change of state being indicative of the occurrence of the major extremum during the second scan;
   relative position sensing means for sensing the positional relationship of the scanning means and the lens means;
   lens drive means for moving the lens means; and
   focus control means for controlling the lens drive means to move the lens means in a direction determined by the positional relationship of the scanning means and the lens means when the output signal changes from the first to the second state during the second scan.

22. The optical system of claim 21 wherein the extremum sensing means comprises:
   hold capacitor means for storing a comparison signal having an amplitude dependent upon the amplitude of a previous extremum in the correlation signal; and
   comparing means for comparing the correlation signal and the comparison signal and providing the output signal.

23. The optical system of claim 22 wherein the extremum sensing means further comprises:
   discharge timing means for discharging the hold capacitor means at a predetermined rate.

24. The optical system of claim 23 wherein the discharge timing means discharges the hold capacitor means by less than about 10% during the first and second scans.

25. The optical system of claim 24 wherein the extremum sensing means further comprises:
   filter means for preventing the comparing means from changing state until the amplitude of the correlation signal decreases by a predetermined amount.

26. The optical system of claim 25 wherein the filter means comprises:
   filter resistor means connected in series with the hold capacitor means.

27. In an optical system including primary optical means, an automatic focusing system for positioning the primary optical means, the automatic focusing system comprising:
   spatial image correlation range sensing means for providing a correlation signal having a major extremum indicative of the distance to an object, the spatial image correlation range sensing means including scanning means for providing a plurality of scan cycles, each cycle comprising first and second scans of an image of the object;
   comparison signal means for providing a comparison signal during the second scan which is a function of the amplitude of the major extremum in the correlation signal during the first scan;
   comparing means for comparing the correlation signal with the comparison signal and producing an output signal which changes from a first to a second state only once during the second scan, and the change being indicative of the major extremum during the second scan;
   positioning means for positioning the primary optical means in a direction determined by the relative position of the scanning means and the primary optical means when the output signal changes from the first to the second state during the second scan.

28. The invention of claim 27 wherein the positioning means comprises:
   relative position sensing means for producing a position signal having a third state when the scanning means and the primary optical means have a first positional relationship and having a fourth state when the scanning means and the primary optical means have a second positional relationship;
   control means for producing a first position correction signal when the position signal changes from the third to the fourth state and the output signal changes from the first to the second state during the second scan while the position signal was in the third state, and for producing a second position correction signal when the position signal changes from the third to the fourth state and the output signal did not change from the first to the second state during the second scan while the position signal was in the third state; and
   positioning means for positioning the primary optical means in response to the first and second position correction signals.

29. The invention of claim 27 wherein the comparison signal means comprises:

hold capacitor means for storing the comparison signal; and discharge timing means for discharging the capacitor means at a predetermined rate.

30. An optical system comprising:
primary optical means for providing a primary image of an object;
auxiliary optical means for providing first and second auxiliary images of the object;
scanning means for providing first and second means of the second auxiliary image;
range sensing means for producing a correlation signal having a major extremum during each scan indicative of best correspondence of the first and second auxiliary images;
comparison signal means for providing a comparison signal during the second scan which is a function of the amplitude of the major extremum in the correlation signal during the first scan;
comparing means for comparing the correlation signal and the comparison signal and producing an output signal which changes from a first to a second state during the second scan only when the correlation signal has a major extremum;
positioning means for positioning the primary optical as a function of the relative positions of the scanning means and the primary optical means during the second scans when the output signal changes from the first to the second state.

31. In an optical system including a primary optical means, an automatic focusing system for positioning the primary optical means, the automatic focusing system comprising:
spatial image correlation range sensing means for providing a correlation signal having a major extremum indicative of the distance to an object, the spatial image correlation range sensing means including scanning means for scanning an image of the object a plurality of scan cycles, each cycle comprising first and second scans;
extremum sensing means for receiving the correlation signal and producing an output signal having a unique effect when a major extremum occurs during the second scan;
relative position sensing means for producing a position signal having a first state when the scanning means and the primary optical means have a first positional relationship and having a second state when the scanning means of the primary optical means have a second positional relationship;
control means for producing a first position correction signal when the position signal changes from the first to the second state and the output signal had its unique effect while the position signal was in the first state, and for producing the second position correction signal when the position signal changes from the first to the second state and the output signal did not have its unique value while the position signal was in the first state; and
position means for positioning the primary optical means in response to the first and second position correction signals.

32. The invention of claim 31 and further comprising:

deadband means for inhibiting the control means for producing the first and second position correction signal if the unique effect occurs within a predetermined interval of the change of the position signal from the first to the second state.

33. An optical system comprising:
primary optical means for providing a primary image of an object;
auxiliary optical means for providing first and second auxiliary images of the object;
scanning means for scanning the second auxiliary image with respect to the first auxiliary image a plurality of scanning cycles, each cycle comprising first and second scans;
range sensing means for producing a correlation signal having a major extremum during each scan indicative of best correspondence of the first and second auxiliary images;
extremum sensing means for receiving the correlation signal and for producing an output signal which changes from a first to a second state only once during the second scan, the change of state being indicative of the occurrence of the major extremum during the second scan;
relative position sensing means for producing a position signal having a state when the scanning means and the primary optical means have a first positional relationship and having a second state when the scanning means and the primary optical means have a second positional relationship;
control means for producing a first position correction signal when the position signal changes from the third to the fourth state and the output signal changed from the first to the second state during the second scan while the position signal was in the third state, and for producing a second position correction signal when the position signal changes from the third to the fourth state and the output signal did not change from the first to the second state during the second scan while the position signal was in the first state; and
positioning means for positioning the primary optical means in response to the first and second position correction signals.

34. The optical system of claim 33 wherein the control means comprises:
bistable means having a fifth state when the position signal changes from the fourth to the third state, and having a sixth state when the output signal changes from the first to the second state and the position signal is in the third state;
first position correction signal producing means for producing the first position correction signal when the bistable means is in the fifth state and the position signal changes from the third state to the fourth state.

35. The optical system of claim 34 and further comprising:
deadband means for inhibiting the first and the second position correction signal producing means if the position signal changes from the third to the fourth state within a predetermined interval of the change of the output signal from the first to the second state.

* * * * *